United States Patent
Chang

(12) 
(10) Patent No.: US 6,243,792 B1
(45) Date of Patent: Jun. 5, 2001

(54) METHOD AND APPARATUS FOR IDENTIFYING A LEAST RECENTLY USED ITEM

(75) Inventor: Wenwei Chang, San Jose, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/182,125

(22) Filed: Oct. 29, 1998

(51) Int. Cl.[7] .................................................... G06F 12/12
(52) U.S. Cl. ................................................................ 711/136
(58) Field of Search .................................. 711/118, 133, 711/136, 207, 160

(56) References Cited

U.S. PATENT DOCUMENTS 5,546,555 * 8/1996 Horstmann et al. ................. 711/207

* cited by examiner

Primary Examiner—Kevin L. Ellis
(74) Attorney, Agent, or Firm—Noreen Krall

(57) ABSTRACT

A method and apparatus for identifying a least recently used item of a set or group of items is disclosed. In accordance the method, a count value is associated with each item. A first count value is assigned to an oldest item, a second count value is assigned to a newest item, and items having an age between the oldest and newest are assigned successive count values between the first and second count values in accordance with the age of the item. When an item is accessed, a pivot count value associated with the accessed item is determined. Each count value between the pivot count value and second count value is incremented in the direction of the first count value. The count value associated with the accessed item is then reset to the second count value. The least recently used item is identified as that item associated the first count value. One or more embodiments of the invention comprise apparatus for performing the method of the invention.

6 Claims, 5 Drawing Sheets

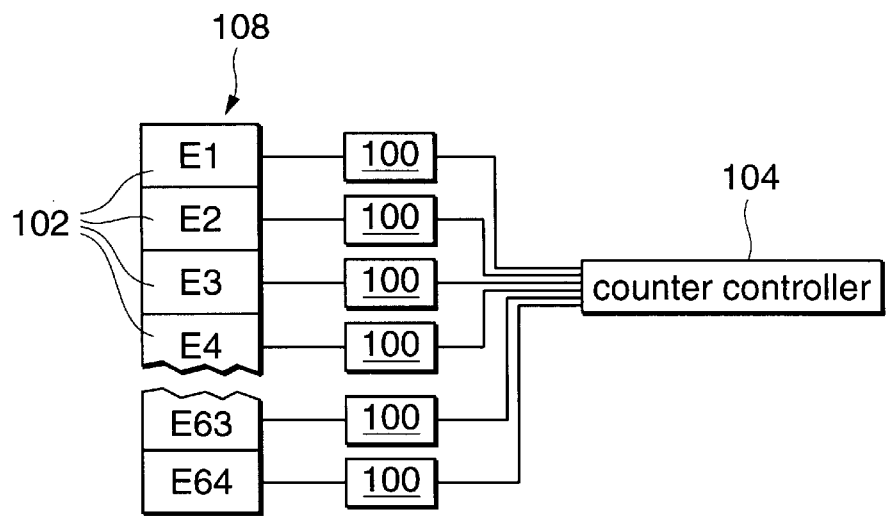
FIG. 6
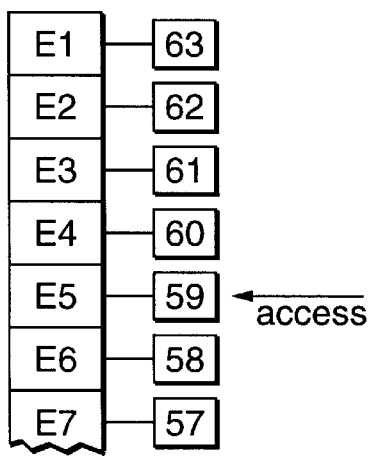
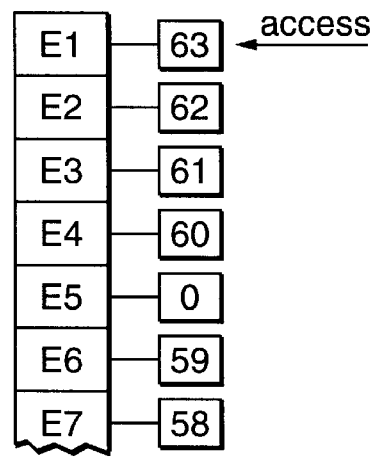
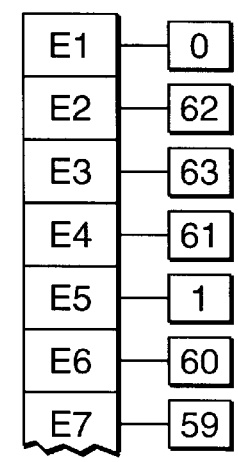
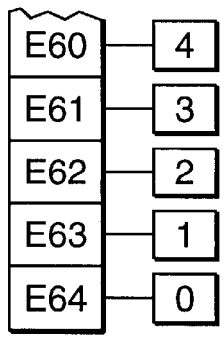
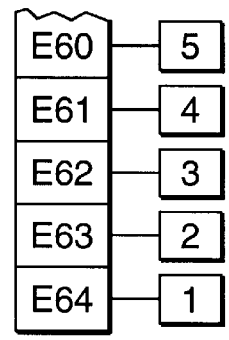
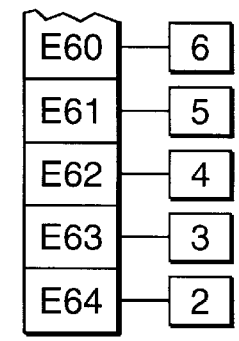
FIG. 7A     FIG. 7B     FIG. 7C

METHOD AND APPARATUS FOR IDENTIFYING A LEAST RECENTLY USED ITEM

BACKGROUND OF THE INVENTION

1. Field of the Invention

The invention is a method and an apparatus for identifying a least recently used (LRU) item of a group or set of items, such as the least recently used data entry associated with a memory cache.

2. Background

In a computer system, data is stored in a memory, such as a hard disk, a random access memory (RAM), or other memory. These memories are capable of storing large amounts of data, but they may be relatively slow or difficult to access. A small, fast memory known as a "cache memory" is used to store a subset of data stored in larger memory. The computer looks first in the cache to see if desired data is available, and if so, obtains it quickly from the cache memory. This is known as a cache "hit". If the desired data is not found in the cache, a cache "miss", the computer retrieves the data from a larger memory and then stores it in the cache for future use. There is a problem in the prior art of determining where in the cache to store the most recently retrieved data.

In many situations, the newly retrieved data replaces the least recently used (LRU) data already found in the cache. This scheme is based on the theory that the least recently used data is less likely to be accessed anytime soon than the more recently selected data.

There are several prior art methods for determining which data associated with the cache is the least recently used. Generally, the cache memory cache can be thought of as a plurality of lines of memory, where each line can store some retrieved data from larger memory. Each line of cache memory is an address at which data can be stored. In one prior art method, a time stamp is associated with each cache address at the time data is placed into the address location. This arrangement is illustrated in FIG. 1. In this example, the memory cache has sixty-four (64) entries or addresses each having associated "time" data "TS" from a time stamp. As an example, the memory cache may comprise a 64×32 memory and the time stamp may comprise a 12 bit stamp indicating month, day, year, hour, minute and second. The least recently used item associated with the cache may be identified from the address or entry having the "oldest" time as indicated by the time stamps.

This method has several disadvantages. One problem is that the time stamp requires a large number of bits to facilitate a time stamp which has sufficient precision to identify the relative age of items. For example, the twelve (12) bit time stamp described above only permits the time stamp to indicate time to the nearest second. In such a case, many entries may be time stamped with the same time, preventing them from being distinguished as the least recently used.

Another problem is that substantial effort is required to identify the least recently used item. In the case of the above-referenced 64×32 memory, if one uses a 4-way search (that is, a search in which four comparisons can be made per cycle) it takes 64 cycles to read through all of the entries and determine the oldest time stamp, and thus the least recently used entry. Even if the memory cache is divided into two 32×32 memories, it takes thirty-three (33) cycles to determine the oldest time stamp.

In another method, a global counter is associated with the memory cache and counts each access to the cache. This arrangement is generally illustrated in FIGS. 2(a–b). Each address or entry of the cache is provided with a count value equal to the count value (C0–C63) of the global counter at the time the entry is accessed. In the arrangement illustrated in FIG. 2(a), the memory has sixty-four (64) addresses or entries, where each entry has been accessed in order and the global count values have been assigned in order.

The least recently used entry is defined as that entry having the lowest associated count value. By searching for the lowest count value in the cache, the least recently used item is supposed to be identifiable.

This arrangement has the significant drawback that the counter will eventually "roll-over" or reset. For example, if the global counter is a six (6) bit counter permitting sixty-four (64) count values from zero (0) to sixty-three (63), the counter will roll over to zero (0) at the next cache access after sixty-three (63). When the counter rolls over, the new entry is assigned the count value of zero (0). This arrangement is illustrated in FIGS. 2(a) and 2(b).

It is noted that the cache is commonly accessed without replacing the least recently used item. In the case illustrated in FIG. 2(b), when the global counter has a count value of sixty-three (63), address or entry E3 is accessed. The global counter resets to zero (0) and assigns count value zero (0) to entry E3.

If the next access of the cache is for the purpose of replacing the least recently used item with an item just retrieved remotely, it is not possible to correctly identify the least recently used item. In the example illustrated in FIG. 2(b), entries E1 and E3 both have assigned count values of zero (0). This is a problem not only because there are two entries with the same count value, but also because the item associated with one entry is actually the oldest and the item associated with the other entry is the newest. This problem results from the "rollover" problem associated with the global counter. With two possible entries being the least recently used entry, the chance of identifying the LRU item correctly is 50%. If a more recently used item is overwritten, and then that same item is requested in a subsequent memory access, the data will not be there, resulting in a cache miss. Cache efficiency is reduced as the number of cache misses increases.

Another problem with this method is that, as with the time stamp system, many cycles of comparisons are required to find the lowest count value to identify the entry or address containing the least recently used item. The large number of comparisons limits system performance.

A method and apparatus for identifying the least recently used item of a group of items which overcomes these problems is desired.

SUMMARY OF THE INVENTION

The present invention is a method and apparatus for identifying the least recently used item of a set of items. In accordance with one or more embodiments of the invention, a unique count value is associated with each item. More particularly, a first count value is assigned to an oldest or least recently used item, a second count value is assigned to a newest or most recently used item, and items having an age between the oldest and newest are assigned successive count values between the first and second count values in accordance with the age of the item.

When an item is accessed, a pivot count value associated with the accessed item is determined. The pivot count value comprises the count value of the accessed item at the time it is accessed. Each count value between the pivot count value and the second count value is incremented in the direction of the first count value. The count value associated with the accessed item is then reset to the second count value. The least recently used item is identified as that item associated with or having the first count value.

In one or more embodiments, each item is associated with an address of a memory cache. Each count value is associated with a counter corresponding to an address of the memory cache.

In one or more embodiments, the first count value is a predetermined high count value and the second count value is a predetermined low count value. The step of incrementing comprises the step of raising the value of the count value of each address location having a count value falling between the pivot count value and predetermined low count value towards the predetermined high count value. The least recently used item is identifiable as the item associated with the predetermined high count value.

In one or more embodiments, the first count value is a predetermined low count value and the second count value is a predetermined high count value. The step of incrementing comprises the step of lowering the value of each count value between the pivot count value and predetermined high count value towards the predetermined low count value. The least recently used item is identifiable as the item having the predetermined low count value.

One or more embodiments of the invention comprise a computer program product, system and/or apparatus for identifying the least recently used item of a group or set of items.

Further objects, features, and advantages of the present invention over the prior art will become apparent from the detailed description of the drawings which follows, when considered with the attached figures.

BRIEF DESCRIPTION OF THE DRAWINGS

FIG. 6 illustrates a memory cache with associated counters and a counter control in accordance with one embodiment of the invention.

FIGS. 7(a–c) illustrate the memory cache illustrated in FIG. 6 in three different conditions.

DETAILED DESCRIPTION OF THE INVENTION

The invention is an apparatus and method for identifying a least recently used (LRU) item of a set or group of items.

In the following description, numerous specific details are set forth in order to provide a more thorough description of the present invention. It will be apparent, however, to one skilled in the art, that the present invention may be practiced without these specific details. In some instances, well-known features may have not been described in detail so as not to obscure the invention.

Portions of the disclosure of this patent document may contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Sun, Sun Microsystems, the Sun logo, Java and all Java-based trademarks and logos are trademarks or registered trademarks of Sun Microsystems, Inc. in the United States and other countries. All SPARC trademarks are used under license and are trademarks or registered trademarks of SPARC International in the United States and other countries. Products bearing SPARC trademarks are based upon an architecture developed by Sun Microsystems, Inc.

Method Of Identifying A Least Recently Used Item

One or more embodiments of the invention comprise a method for identifying a least recently used item from a set or group of items. In one or more embodiments, the item to be identified is associated with an address or entry of a memory cache of a computer.

As used herein, the term "item" is intended to mean information, data, a character or characters, a numeral or numerals, a character string, an object or object or any other thing(s).

Figure 5:
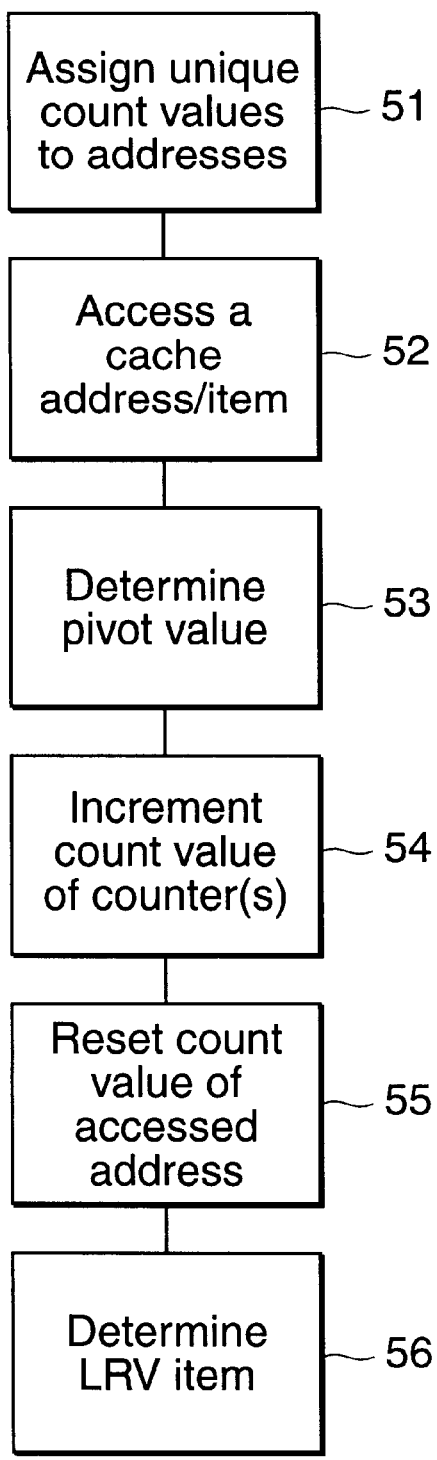
FIG. 5 is a flow diagram of a method of determining the least recently used item of a memory cache in accordance with one embodiment of the invention.

Referring to FIG. 5, in a first step S1 of one embodiment method, each item is assigned or associated with a unique count value. The count value of a least recently used or oldest item comprises a first count value, and the count value associated with a newest or most recently used item comprises a second count value. Items having an age between the oldest and newest items have successive count values between the first and second count values in accordance with the age of the item (the closer the count value is to the first count value, the older the item). In one or more embodiments, and as described below, the count value of an item is associated with an address of the cache with which the item is associated.

In a step S2, an item associated with the cache is accessed. In a step S3, the count value associated with that item, referred to herein as a "pivot value," is determined. In a step S4, each count value between the pivot count value and the second count value is incremented in the direction of the first count value. In a step S5, the count value associated with the accessed item is reset to the second count value. In a step S6, the least recently used item may be identified as that item associated with the first count value.

Configuration of Counters

An embodiment of the invention will now be described with reference first to FIG. 6. As illustrated, a separate counter 100 is associated with each entry or memory address 102 of the memory cache 60. In the embodiment illustrated, the cache 60 includes sixty-four (64) addresses 102 (labeled E1 through E64). The cache 60 may be of any size or capacity.

Each counter 100 is adapted to have assigned to it or to store the above-referenced count value. In at least one embodiment, each counter 100 facilitates unique count values in a number at least equal to the number of addresses 102 of the cache 60. In the embodiment illustrated, each counter 100 is a six (6) bit counter providing sixty-four (64) count values from zero (0) to sixty-three (63).

The counters 100 are controlled by a common counter controller 104. Initially, the addresses 102 of the cache 60 are empty or unassociated with data items. As the computer system access data from memory, the addresses 102 are filled or associated with items until the cache 60 is full. In accordance with step S1 of FIG. 5, a unique count value is assigned to each counter 100 as the cache 60 fills.

In one embodiment, when the cache 60 is empty, each counter 100 is set to a predetermined low count value. In the embodiment illustrated, this value is zero (0). Each time an empty address 102 or entry is filled with an item (meaning that an address which was otherwise unassociated with an item is now associated with an item), the count value of the counter 100 associated with that address 102 is incremented, as is the count value of each other counter 100 associated with an address 102 which has already been filled or accessed. If an address 102 is accessed more than once before all of the addresses 100 are filled, the count values of the counter 100 are not changed or affected. In the embodiment illustrated, each increment raises the count value of a counter 100 by a value of one (1).

When the cache 60 is filled, each counter 100 has a unique count value (e.g. from 0 to 63). The address 102 associated with the oldest item has a first or predetermined largest count value. In this embodiment, the first or predetermined high count value is sixty-three (63). The address 102 associated with the newest item has a second or predetermined smallest count value. In this embodiment, the second or predetermined low count value is zero (0). Every other address 102 has a counter with a unique count value somewhere between the first and second count values in order of the age of the item relative to the oldest and newest items. In this embodiment, the other counters 100 have values one through sixty-two (1–62).

Next, in accordance with step S2, the cache 60 is accessed. Any address of the cache 60 may be accessed. For example, the CPU 28 may access an item corresponding to a specific address. If the item which is desired is not present in the cache 60, then it must be obtained from the remote source 62. This item then replaces the least recently used item in the cache 60.

In accordance with step S3, the count value of the counter 100 of the accessed address is determined. This count value is the "pivot value".

Thereafter, the controller 104 is arranged to increment the count value of all counters 100 having a present count value between the pivot value and the second or predetermined low value in the direction of the first or predetermined high value. In this embodiment, this requires the controller 104 to increment the count value associated with each counter 100 having a present count value between zero (0) and the pivot value by one (1) towards the first or predetermined high count value of sixty-three (63). The controller 104 then sets the count value of the counter 100 associated with the accessed address 102 to the first or predetermined low count value in accordance with steps S4 and S5.

Counter Values During Operation

FIGS. 7(*a*) and 7(*b*) illustrate an example of this process. FIG. 7(*a*) illustrates the condition of the cache 60 and associated counters 100 when all of the addresses 102 have been accessed in succession. The counters 100 associated with the addresses 102 each have a unique count value. The count value of the counter 100 associated with the oldest or least recently used address is the first or predetermined high value of sixty-three (63), while the count value of the counter 100 associated with the newest or most recently used address is the second or predetermined low value of zero (0).

FIG. 7(*b*) illustrates the count values of the counters 100 after the item associated with address E5 has been accessed. This location becomes the pivot point and the count value at address location E5 is the pivot value. In this example, the pivot value is fifty-nine (59) (i.e. the count value of the accessed address (E5) was fifty-nine (59) when accessed). The count value of all counters 100 having a count value less than that of pivot value (59 in this example) is incremented. Thus, counters 100 having count values of zero to fifty-eight (0–58) are incremented by one (1) so they now have count values of one to fiftynine (1–59). Next, the counter 100 associated with the accessed address is reset or set to the predetermined low value. In this case, the count value associated with the accessed address (E5) is set to zero (0). This satisfies the previously stated condition that the most recently used item should have the lowest counter value.

After this process, each address 102 is associated with a counter 100 still having a unique count value. The most recently used item is associated with the address (E5) having the counter 100 with the lowest count value (0). The least recently used item is associated with the address (E1) having the counter 100 with the first or predetermined high count value of sixty-three (63).

FIG. 7(*c*) illustrates the condition of the cache 60 and associated counters 100 after the least recently used item of the cache 60 in the state illustrated in FIG. 7(*b*) has been accessed. As stated above, in the event a particular item must be obtained from a remote source 62, this item is generally placed in the cache 60 in replacement of the least recently used item. The least recently used item is easily identified as the item associated with the address having the counter 100 with the first or predetermined high count value. In the arrangement illustrated, this value is the predetermined high value of sixty-three (63). This address is E1.

The count value of all counters 100 having a count value less than that of the counter 100 associated with the accessed address (E1) are incremented. In this instance, all of the counters 100 must be incremented, since they all necessarily have a count value smaller than the largest value. Thus, the counters 100 having count values of zero to sixty-two (0–62) are incremented by one (1) so they have count values of one to sixty-three (1–63). Next, the counter 100 associated with the accessed address (E1) is reset or set to the predetermined low value. In this case, the count value is zero (0), reflecting that this address is associated with the now most recently used item.

After this process, each address 102 (and thus item) is associated with a counter 100 still having a unique count value.

In another embodiment of the invention, the least recently used item is associated with an address 102 having a counter 100 with a first value which is a predetermined low count value (zero in an arrangement corresponding to that above where there are sixty-four cache addresses). In this arrangement, the most recently used item is associated with an address 102 having a counter 100 with a second value which is a predetermined high value (sixty-three in an arrangement corresponding to that above). When the an address of the cache 60 is accessed, each counter 100 having a count value between the pivot value and the predetermined high value are incremented in the direction of the predetermined low value (i.e. decreased) and the count value of the counter 100 associated with the accessed address 102 is set to the predetermined high value.

In other embodiments of the invention, the least recently used item may be associated with any count value. In one or more embodiments of the invention, the counter increment may be other than one (1), such as two (2) or more. For example, for a cache comprising sixty-four (64) entries, a low value may be zero (0) and a high value one-hundred twenty-four (124) with each count value therebetween comprising the even numbers between the low and high values (i.e. 2, 4, 6, 8 etc.). Thus the term "successive" as used above is not limited to numeric order, but a hierarchy or progression.

While the invention is described for use in identifying the least recently used of a set of items, the invention may be used to identify the most recently used item or any other specific item of the set of items. For example, in the example described above and illustrated in FIGS. 6 and 7(a–c), the most recently used item may be readily identified from the second or lowest counter value.

By using the method described herein, the invention avoids the is problems associated with counter "roll-over" suffered in the arrangement where a single counter is utilized. The least recently used item is always easily identified as that item associated with an address having a count value equal to a first value.

In addition, the invention permits identification of the least recently used item in a less demanding manner than required by methods of the prior art. In the present arrangement, the least recently used item can be identified in a single cycle since relative comparisons of values associated with entries do not need to be made. Instead, the only comparison that needs to be made is whether the particular counter of an address has a count valve equal to the first value. In embodiment described in conjunction with FIGS. 6 and 7(a–c), this value is sixty-three (63).

Embodiment of Computer Execution Environment (Hardware)

Figure 1:
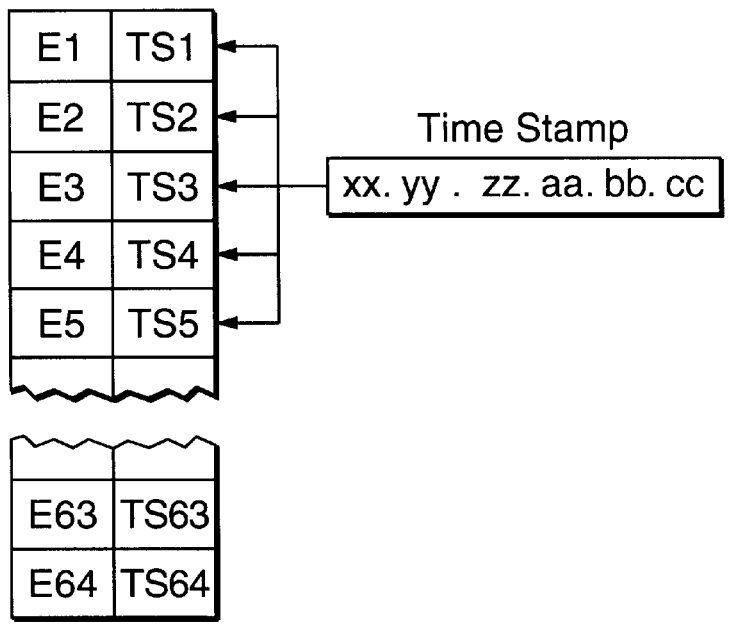
FIG. 1 illustrates a memory cache in accordance with a first arrangement of the prior art where a time stamp associates time stamp data with each item of the cache.
Figure 2A:
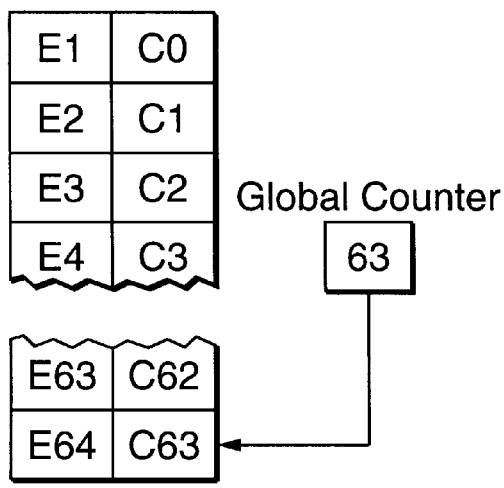
FIG. 2(a) and 2(b) illustrate a memory cache in accordance with a second arrangement of the prior art where a global counter associates a global count value with each item of the cache, the cache illustrated before and after a global counter roll-over.
Figure 2B:
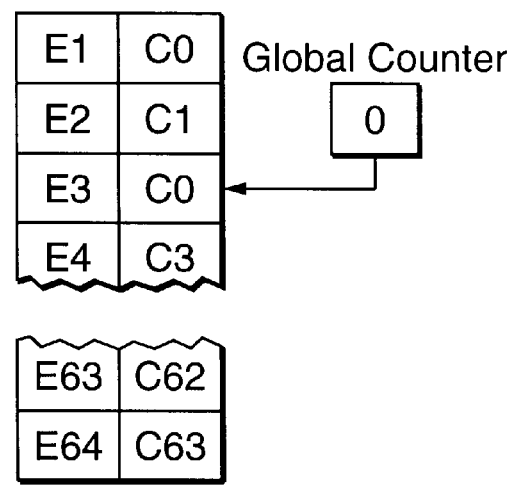
Figure 3:
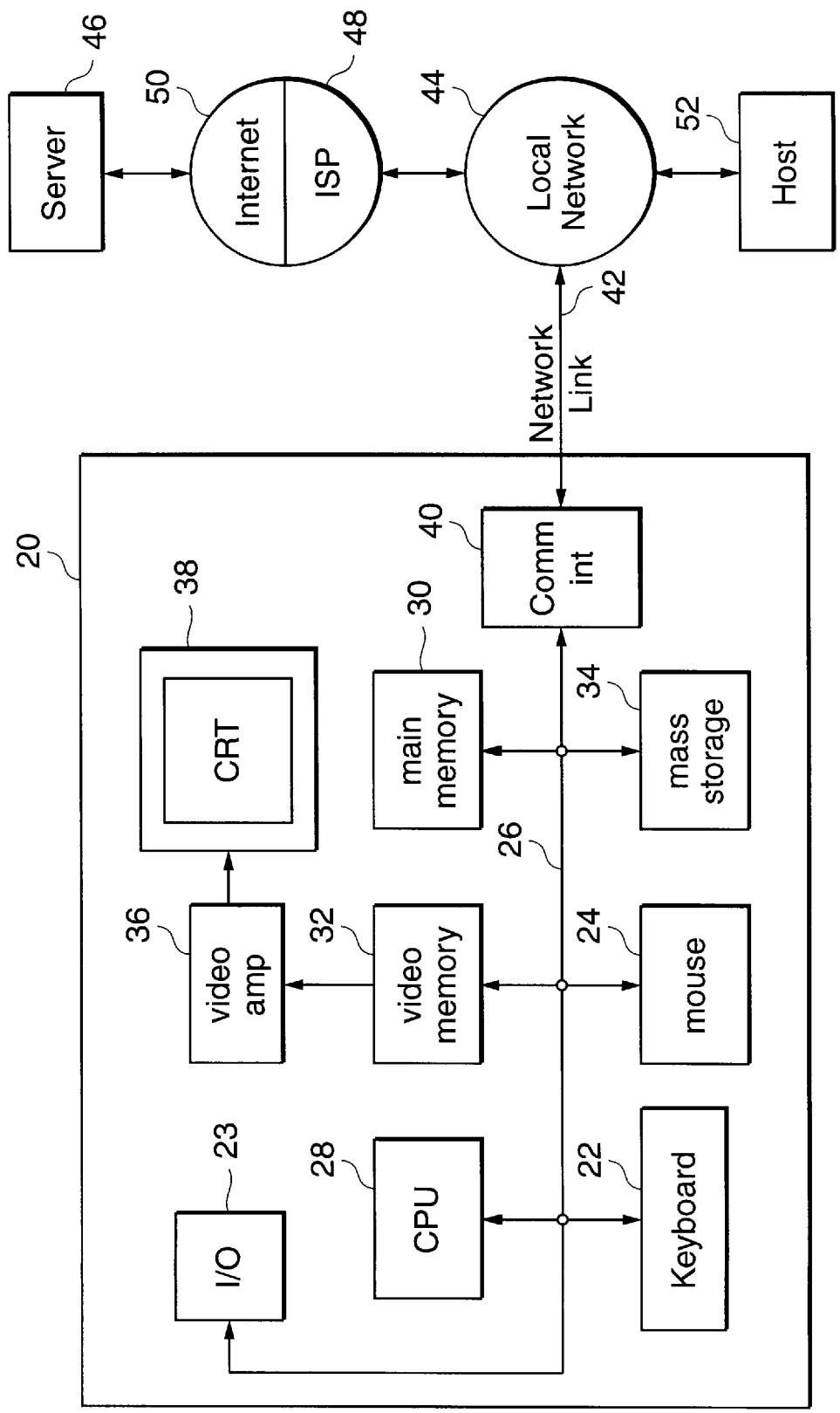
FIG. 3 diagrammatically illustrates one embodiment of a computer system capable of providing a suitable execution environment for an embodiment of the present invention.
Figure 4:
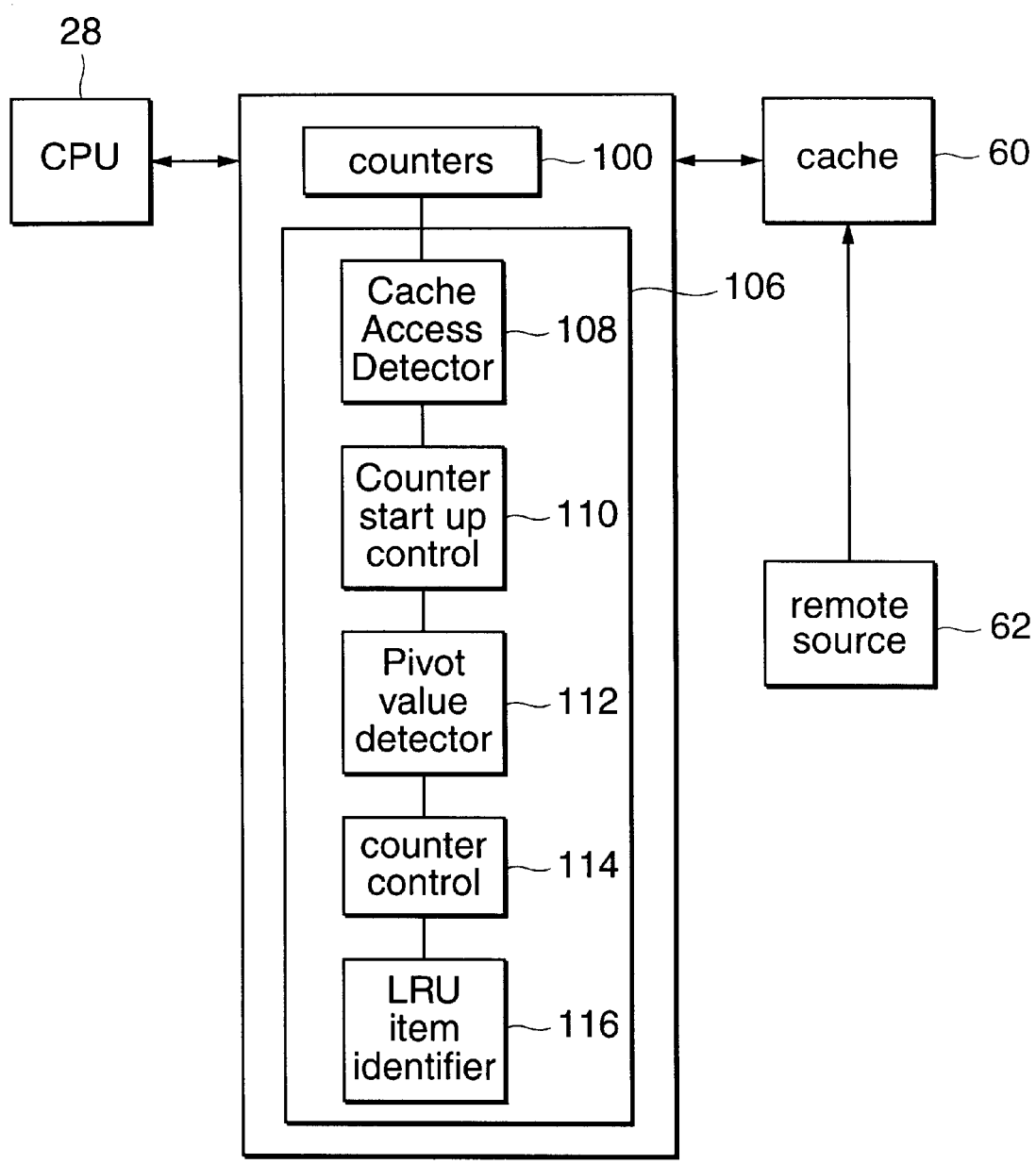
FIG. 4 illustrates a least recently used item identification system of one embodiment of the invention and the interrelationship of that system to a computer processing unit, memory cache and remote source of items.

One or more embodiments of the invention can be implemented as computer software in the form of computer readable code executed on a computer, such as that illustrated in FIGS. 3 and 4, or in the form of bytecode class files executable within a Java runtime environment running on such a computer.

In one or more embodiments, and as illustrated in FIG. 4, the computer 20 includes a least recently used item identification system 106. This system 106 generally embodies the counter(s) 100 and counter control 104 described above. Such a system 106 may comprise hardware and/or software associated with the computer 20 and/or CPU 28.

In one embodiment, the system 106 is provided between the cache 60 and CPU 28. The system 106 includes a counter 100 associated with each address of the cache 60.

A cache access detector 108 determines when the CPU 28 is accessing an item or address of the cache 60. The system 106 includes a cache start-up control 110 which is arranged to control the counters 100 when the cache 60 is accessed for the first time and until the cache is filled (in accordance with step S1 of FIG. 5).

The system 106 includes a pivot value detector 112 for determining the pivot value of an address when the cache 60 is accessed after it is filled. The system 106 includes a counter control 114 arranged to increment the necessary counters and to reset the counter of the accessed address. The system 106 includes a least recently used item identifier 116 arranged to identify the least recently used item from the count values of the counters 100, in a manner described above.

While the invention is not so limited, in one or more embodiments, the invention may be used to determine the least recently used item associated with a memory cache of a computer, such as that illustrated in FIG. 3. The computer 20 illustrated in FIG. 3 includes a keyboard 22 and a mouse 24 coupled to a bidirectional system bus 26. The keyboard 22 and mouse 24 are for introducing user input to the computer system and communicating that user input to a processor 28. Other suitable input devices may be used in addition to, or in place of, the mouse 24 and the keyboard 22. An I/O (input/output) unit 23 coupled to a bidirectional system bus 26 represents such I/O elements as a printer, A/V (audio/video) I/O, etc.

The computer 20 includes a video memory 32, a main memory 30 and a mass storage 34, all coupled to the bidirectional system bus 26 along with the keyboard 22, the mouse 24 and the processor 28. The mass storage 34 may include both fixed and removable media, such as magnetic, optical or magnetic optical storage systems or any other available mass storage technology. The bus 26 may contain, for example, thirty-two address lines for addressing a video memory 32 or a main memory 30. The system bus 26 also includes, for example, a 32-bit data bus for transferring data between and among the components, such as the processor 28, the main memory 30, the video memory 32 and the mass storage 34. Alternatively, multiplex data/address lines may be used instead of separate data and address lines.

Referring to FIG. 5, a memory cache 60 may be associated with the CPU 28. As illustrated, the cache 60 is positioned between the CPU 28 and a remote source 62 of items, such as data. The exact position of the cache 60 may vary. The cache 60 may actually comprise a portion of the CPU 28. The remote source(s) 62 of items may comprise the main memory 30 or mass storage device 34 as illustrated FIG. 3. The cache 60 may be of a variety of types, such as a high speed static RAM, and may be of a variety of sizes, such as 512KB.

In one embodiment of the invention, the processor 28 is a microprocessor manufactured by Motorola, such as the 680X0 processor or a microprocessor manufactured by Intel, such as the 80X86, or Pentium processor, or a SPARC microprocessor from Sun Microsystems, Inc. However, any other suitable microprocessor or microcomputer may be utilized. The main memory 30 is comprised of dynamic random access memory (DRAM). The video memory 32 is a dual-ported video random access memory. One port of the video memory 32 is coupled to a video amplifier 36. The video amplifier 36 is used to drive a cathode ray tube (CRT) raster monitor 38. The video amplifier 36 is well known in the art and may be implemented by any suitable apparatus. This circuitry converts pixel data stored in the video memory 32 to a raster signal suitable for use by the monitor 38. The monitor 38 is a type of monitor suitable for displaying graphic images. Alternatively, the video memory could be used to drive a flat panel or liquid crystal display (LCD), or any other suitable data presentation device.

The computer 20 may also include a communication interface 40 coupled to the bus 26. The communication interface 40 provides a two-way data communication coupling via a network link 42 to a local network 44. For example, if the communication interface 40 is an integrated services digital network (ISDN) card or a modem, the communication interface 40 provides a data communication connection to the corresponding type of telephone line, which comprises part of the network link 42. If the communication interface 40 is a local area network (LAN) card, the communication interface 40 provides a data communication connection via the network link 42 to a compatible LAN. The communication interface 40 could also be a cable modem or wireless interface. In any such implementation, the communication interface 40 sends and receives electrical, electromagnetic or optical signals which carry digital data streams representing various types of information.

The network link 42 typically provides data communication through one or more networks to other data devices. For example, the network link 42 may provide a connection through a local network 44 to a local server computer 46 or to data equipment operated by an Internet Service Provider (ISP) 48. The ISP 48 in turn provides data communication services through the world wide packet data communication network now commonly referred to as the "Internet" 50. The local network 44 and Internet 50 both use electrical, electromagnetic or optical signals which carry digital data streams. The signals through the various networks and the signals on the network link 42 and through the communication interface 40, which carry the digital data to and from the computer 20, are exemplary forms of carrier waves transporting the information.

The computer 20 can send messages and receive data, including program code, through the network(s), the network link 42, and the communication interface 40. In the Internet example, a remote server computer 52 might transmit a requested code for an application program through the Internet 50, the ISP 48, the local network 44 and the communication interface 40.

The received code may be executed by the processor 28 as it is received, and/or stored in the mass storage 34, or other non-volatile storage for later execution. In this manner, the computer 20 may obtain application code in the form of a carrier wave.

Application code may be embodied in any form of computer program product. A computer program product comprises a medium configured to store or transport computer readable code or data, or in which computer readable code or data may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment, including embedded devices (e.g., web phones, etc.) and "thin" client processing environments (e.g., network computers (NC's), etc.) that support a virtual machine.

The foregoing description is that of preferred embodiments of the invention, and various changes and modifications may be made without departing from the spirit and scope of the invention, as defined by the claims.

What is claimed is:

1. A method of filling a memory cache with a set of items for identifying a least recently used item of the set of items, comprising:

associating each address of the memory cache with a counter adapted to have a count value between a first count value and a second count value;

before the addresses of the memory cache are filled, setting the count value of the counters to the second count value;

after the addresses of the memory cache are filled, accessing a second address of the memory cache;

determining as a pivot value the count value of the counter associated with the accessed second address, and incrementing, toward the first count value, the count values between the pivot value and the second count value; and setting the count value of the counter associated with the second address to the second count value.

2. A method of filling a memory cache with a set of items for identifying a least recently used item of the set of items, comprising:

associating each address of a memory cache with a counter adapted to have a count value between a first count value and a second count value;

before the addresses of the memory cache are filled, accessing a first address of the memory cache;

if the accessed first address is filled, then maintaining the count values of the counters associated with the addresses filled with items;

after the addresses of the memory cache are filled, accessing a second address of the memory cache;

determining as a pivot value the count value of the counter associated with the accessed second address, and incrementing, toward the first count value, the count values between the pivot value and the second count value; and setting the count value of the counter associated with the second address to the second count value.

3. A computer system comprising:

a processor;

a memory cache coupled to the processor, wherein the memory cache has at least two addresses;

a separate counter associated with each address of the memory cache, wherein each separate counter is adapted to hold a counter value between a first count value and a second value;

a pivot value detector coupled to the counters for determining as a pivot value the count value held in the separate counter associated with an accessed address of the memory cache;

a counter control coupled to the counters for incrementing, toward the first count value, the count values between the pivot value and the second count value; and a cache start-up control coupled to the counters, wherein the cache start-up control at least controls the counters before the memory cache is filled.

4. The computer system of claim 3, wherein the cache start-up control is configured to set the count value of the counters to the second count value before the memory cache is filled.

5. The computer system of claim 3, wherein, the cache start-up control is configured to send an instruction, before the memory cache is filled, to increment, toward the first count value, the count values of the separate counters associated with the filled addresses of the memory cache.

6. The computer system of claim 3, wherein the cache start-up control is configured to send an instruction, before the memory cache is filled, to maintain the count values of the counters associated with the filled addresses.

* * * * *